Figure 2:
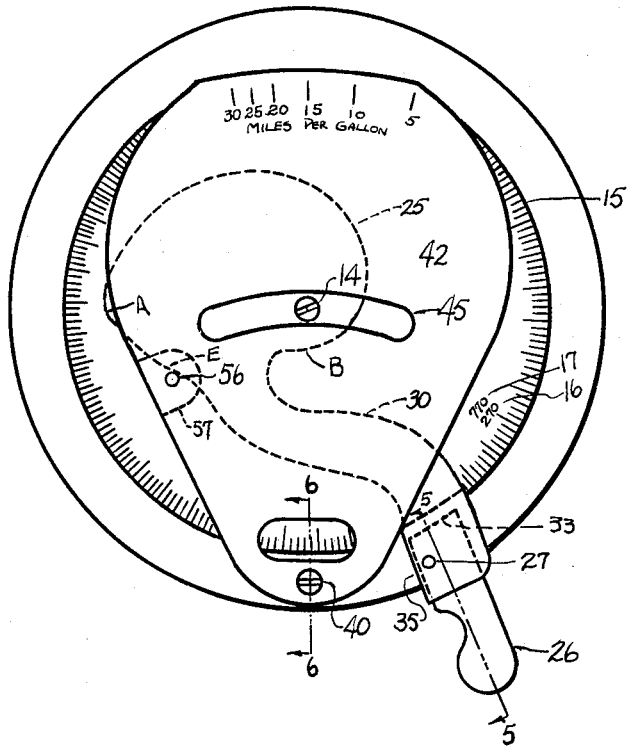

Nov. 22, 1955 A. W. SHERWOOD 2,724,552
GAS MILEAGE COMPUTER
Filed March 15, 1951 3 Sheets-Sheet 1
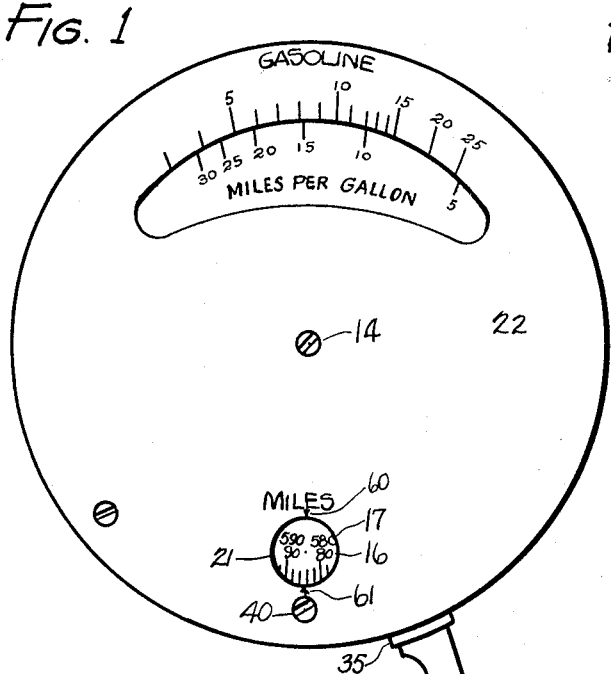
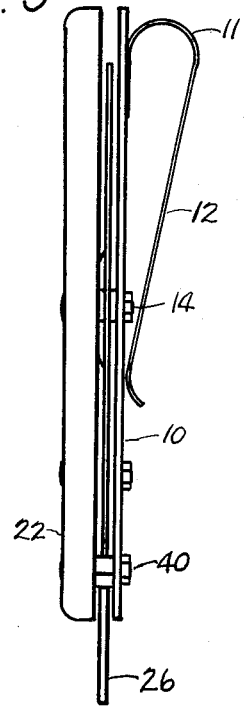
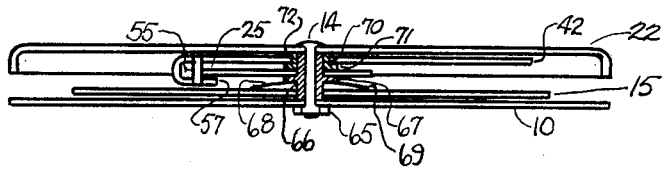
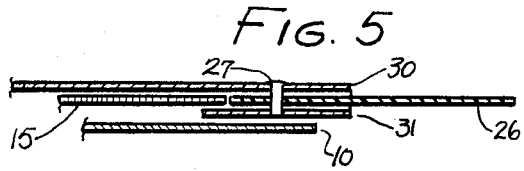
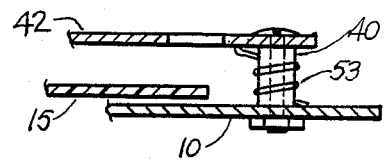
INVENTOR
A. W. Sherwood
BY Henry H. Snelling
ATTORNEY Nov. 22, 1955  A. W. SHERWOOD  2,724,552
GAS MILEAGE COMPUTER Filed March 15, 1951  3 Sheets-Sheet 2

INVENTOR
A. W. Sherwood
BY Henry H. Snelling
ATTORNEY

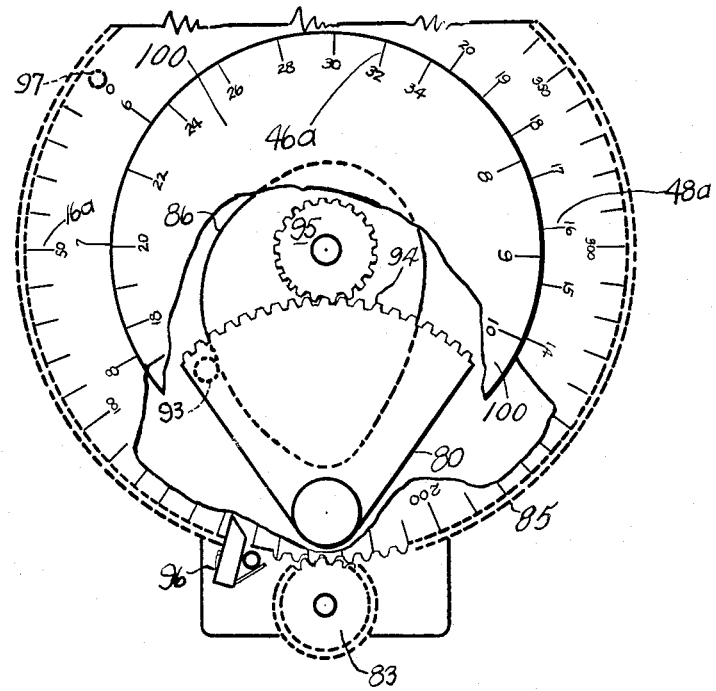
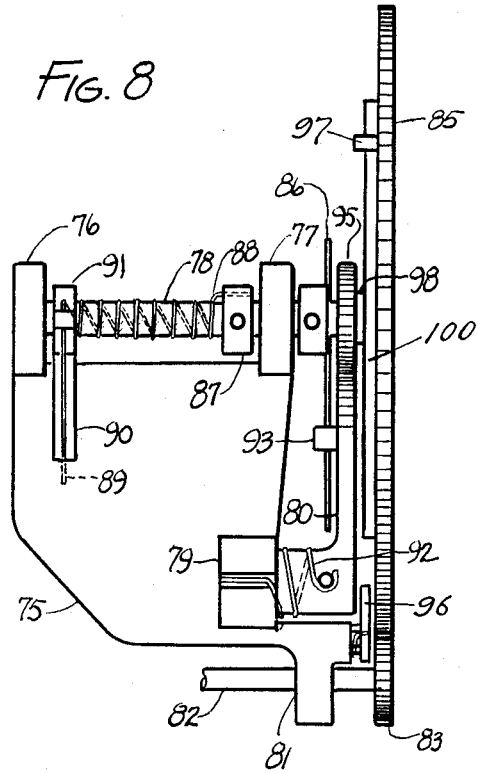

United States Patent Office 2,724,552
Patented Nov. 22, 1955

2,724,552
GAS MILEAGE COMPUTER
Aaron W. Sherwood, Hyattsville, Md.

Application March 15, 1951, Serial No. 215,827

23 Claims. (Cl. 235—78)

This invention relates to devices for determining the number of miles that are obtained per gallon of fuel when purchasing sufficient gasoline to fill the tank so that the difference between the present and the last odometer readings gives the miles traveled since the last purchase.

The principal object of the invention is to provide such a device that shall require but a single movement of a lever or other member to bring the new odometer reading to an initial or normal position, whether the device be manually or automatically driven.

A further object is to provide a pivoted scale which is moved in proportion to the logarithm of the difference between two consecutive odometer readings and particularly one in which a logarithmic cam engages a follower which moves inward toward the pivot of the cam as the mileage difference increases.

A further object is to provide a calculator comprising a rotatable member with a graduated scale and a cam designed to move the follower according to the logarithm of the angular rotation of the cam, and means for coupling the cam to the rotatable member during movement of the rotatable member in the direction of increasing graduations and uncoupling in the reverse direction.

A still further object is to provide a device of this type including a disk with graduations to correspond with speedometer mileage readings so that the advancement of the disk from one setting to another corresponds to the distance traveled between the two settings and means to express automatically the distance according to a logarithmic law.

The principle on which the calculator is based is that the gasoline mileage equals the distance in miles divided by the number of gallons used or log Gas Mileage=log (Distance$_a$—Distance$_b$)—log (Gallons to fill Tank), or transposed:

$$-\log GM = \log GtfT - \log (D_a - D_b)$$

the latter permitting the use of a cam follower which moves proportionately to the logarithm of the mileage corresponding to the cam setting, with inward movement as the miles increase.

Figure 9:
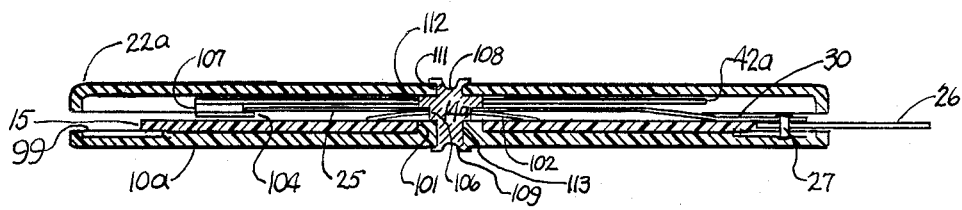

In the drawings:

Figure 1 is normal face view.
Figure 2 is a face view with cover plate omitted.
Figure 3 is a side view.
Figure 4 is a central section.
Figure 5 is a section on line 5—5 of Fig. 2.
Figure 6 is a section on line 6—6 of Fig. 2.
Figure 7 is a face view of a modification.
Figure 8 is an edge view of the modification.
Figure 9 shows a plastic case.

To the base 10 which may carry a clip 11 with a spring plate 12 to engage the sun visor (not shown) of an automobile is centrally pivoted as at 14 a large mileage disk 15 on which are two concentric series of graduations, the outer series 16 carrying the numerals from zero to 499 and the inner series 17 having the numerals 500 to 999.

It is preferred that the disk 15 be manually turned at such time as gasoline is purchased. To this end the cam 25, on the pivot pin 14 which mounts the disk 15, has a toggle lever handle 26 pivoted as at 27 between the extended lever arm 30 of the cam and the retainer 31 which lies below the disk and is a folded portion of arm 30. (See Figure 5.) The end 33 of the lever handle 26 is thus kept in perfect registry with the disk 15 as both disk 15 and arm 30 have a common pivotal axis, and moves the disk when the lever 26—30 is moved about pivot 14 in a counterclockwise direction because the end 33 frictionally engages the edge of the disk 15 but the cam 25 moves without affecting the mileage disk 15 when the lever 26—30 is moved clockwise to normal posiiton at which time the back 35 of the cam arm and the integral retainer touches the stop screw 40 which preferably passes thru the clip 11 and the base 10, and is the pivot about which the cam follower 42 oscillates. In this clockwise movement the lever handle 26 engages the back 35 so there is a tiny space between the end 33 and the disk 15.

The cam follower 42 carries a miles per gallon scale 46 calibrated reversely to the logarithmic scale 48 on the margin of the window 50 of the cover plate 22, this latter scale reading in gallons of gasoline purchased to fill the tank. In the plastic form shown in Fig. 9 the cover plate 22a is transparent and the window is not needed. The follower 42 is slotted as at 45 to clear the pivot 14. A spring 53 coiled about stop pivot 40 urges the follower 42 toward the right as far as cam 25 permits, that is, to hold the roller 55 on shaft 56 (carried by the follower 42 and its integral lip 57) against the curved surface of the cam. Usually the roller and its shaft are integral as the friction is so very slight and the roller is then a mere pin joining the two parallel sides of the follower. When the device is driven by the automobile, the cam is engaged by an odometer-driven spring clutch. The device is then reset by releasing the gear 83 from gear 85, the shaft of the former yielding downwardly.

The curved surface of the cam from point B to point A is the active portion of the cam surface and the curved surface from point A to point E serves merely to prevent abnormal divergence between the scales 46 and 48 when the lever is being moved thru a small angle corresponding to mileage differences below 40 miles. This minimum is dictated by the fact that the tank is rarely filled that soon, and more particularly because at lesser miles the logarithmic curve of the cam rises too steeply. The active portion of the curve varies therefore from 40 miles at point A to 400 miles at point B near the center of the device.

The radius from point A to the center is arbitrarily established. Two inches has been found quite satisfactory for a manually operated calculator of such size and weight as to be supported conveniently on the sun visor in easy reach of the driver. The angular movement of the follower 42 about its pivot 40 is proportional to the logarithm of the angular movement of the cam 25 about its pivot 14 in the center of the calculator, the latter movement being exactly proportional to the miles traveled as indicated on the scales 16 and 17 on the mileage disk 15. The distance between the cam follower roller 56 (or pin) and the pivot 40 is arbitrarily selected to be best suited to the size of the mileage dial.

The points on the curved surface of cam 25 from arbitrarily selected point A inwardly to point B on a constantly decreasing radius as the miles traveled increase are determined in quite usual fashion, for example: to obtain a point corresponding to an increase in mileage difference from 40 miles (point A) to 50 miles, we theoretically move the center of pivot 40 thru an angle corresponding to ten miles more on scale 16, i. e., 50 miles, in opposite direction to the usual movement of disk 15. The angle A–40–14 is proportional to the logarithm of 40 miles (point A) so the new point is at a smaller angle reduced from the previous angle for 40 miles by an amount proportional to log 50—log 40 and so on to point B which corresponds to 400 miles giving a range of 40 to 400, the latter being as great a distance as any ordinary car can travel without refilling.

The logarithmic scale may be 2 to 20, 3 to 30, 4 to 40 etc., the second of these being illustrated. The scale 46 is the same but reversed and has a practical range of 5 to 30 miles per gallon but could easily be extended to 40 or more by increasing the size of the window 50.

To operate, the device is slipped from the holding place on the dash or the sun shield and held in the left hand. At this time the numeral on scale 16 (or 17 if the last three digits are above 499) which is in registry with the arrows 60 and 61 corresponds to the last three digits of the odometer reading at the last time gasoline was purchased to fill the tank. The driver now grasps the handle or lower end 26 of the toggle lever and moves the lever counterclockwise about main pivot 14 until the present odometer reading appears on scale 16 or 17 opposite the arrows 60 and 61. At this time the miles per gallon scale 46 has been moved to proper registry with relation to the fixed scale 48 on the cover, automatically, so that the number of miles per gallon appears on movable or answer scale 46 below the number of gallons to fill the tank as read on the fixed scale 48. As the end 33 of the handle 26, acting as a pawl, moves the mileage disk 15 in accordance with the number of miles traveled, it simultaneously moves the logarithmic scale 46 to set up the logarithm of the miles traveled subtractively, and thus deduct it from the logarithm of the number of gallons to fill the tank, thus giving the miles per gallon for the trip.

As an example, the old reading was 23,848 so 848 appears in the window 21 in line with the arrow. The new mileage is 24,170 and 17½ gallons were purchased. The old mileage was on the upper scale 17 but the new reading, being less than 500 for the last three digits, will be on the lower scale 16 and the reading 170 is moved into registry with the arrow 61 by a single counter-clockwise movement of the handle 26 which remains in its new position until the answer in miles per gallon, 18.4, is read on the central scale 46 in the window 50 in registry with the quantity, 17½, on the scale 48 and on the similar scale 63, and is then returned to bottom position without moving the disk 15. These two outer scales read from left to right while the central or miles per gallon scale reads from right to left. Only after the reading has been taken, and entered in a diary if desired, is the handle 26 moved to its lowest position, touching the stud 40. The consecutive readings on scales 16 and 17 are always in sequence, that is the smaller number in any one calculation becomes the larger number in the next calculation. Thus any ordinary reading may always be made by one single movement of the handle 26. A single clockwise or reverse movement prepares the calculator for the next cycle. The scale 46 moves automatically into the most convenient position for reading as urged by its spring 53 and limited by contact with the edge of the cam 25.

The central pivot, as best seen in Figures 4 and 9, is of considerable importance because the mileage disk 15 should resist movement except when rotated by the handle 26 in counterclockwise movement; the cam must be nicely supported to prevent undue wabble and the same is true of the cam follower 42. Because of these reasons, in the metal case form I prefer that the main pivot 14 shall be a screw rather than a rivet or spun over form as in the plastic case. A nut 65 binds the post 66 between the top plate 22 and the base 10. The post has a central flange 67 which engages a washer 68 which might be bowed down slightly on the ends as at 69 to make firm engagement with the mileage disk 15 which normally would be made of cardboard and is just a bit thicker than the distance between the base 10 and the bottom surface of the washer 68 which, altho very advantageous, is obviously optional because the flange 67 may rest upon and compress the cardboard disk 15. The cam 25 fits the smaller diameter 70 of the post 66 reasonably well but not too snugly. The cam is therefore not gripped but has a wide surface of support on the upper surface of the wide flange 67 and has an even wider support by the spacer 71 which engages the cam on its bottom flat side and has a boss 72 which fits the hole in the cam follower 42 quite well. The axial distance of the smaller diameter 72 of the spacer 71 is, however, longer than the thickness of the cam follower by a few thousandths of an inch so that the cam follower is guided quite well without any gripping. The tiny wabble of the cam follower aids in making the device fool proof and, obviously, is very limited because of the relatively large diameter of the spacer below the follower and the very small tolerance between the follower and the top plate above it and the spacer beneath it. In Fig. 9 the cam is stabilized by the pressure of a curved washer 102.

In the modified and automatic device shown in Figures 7 and 8 the base is a plate 75 having at the top two bearings 76 and 77 for the main shaft 78 and a single bearing 79 for the segment 80 and below this a bearing 81 for the flexible shaft 82 leading from the normal odometer unit of the automobile. Shaft 82 carries a pinion 83 in mesh with large gear 85 on the main shaft 78 to which the cam 86 is fast as is the collar 87 anchoring the spring 88 at one end. At its other end 89 the spring 88 rests lightly against the base 75 so it may slip thru the slot 90 whenever necessary to prevent overwinding. The collar 91 is loose on the shaft and merely positions the free end of the spring.

Cam 86 constantly moves the segment 80 against the urge of its spring 92 by engaging the follower 93. The segment by its teeth 94 turns the miles per gallon scale 46a on disk 100 through the pinion 95, said pinion and disk being coupled together and freely rotatable on the main shaft 78.

The latch 96 readily permits passage of pin 97 when the mileage scale 16a on gear 85 is turning clockwise as it would when driven by pinion 83 but forms a stop when the gear is moved by spring 88 to reset position when the pinion 83 is manually disengaged, as by being lowered out of mesh, the flexible shaft 82 readily yielding for this purpose, after the miles per gallon has been read. The miles per gallon scale 46a on disk 100 constantly turns with the pinion 95 being connected to it by a sleeve 98 loose on the main shaft 78. The scale 48a of gallons of gasoline to fill the tank is located on the large transparent gear 85 just inside of the mileage scale 16a at the periphery of gear 85, the two scales being circular and coaxial with the gear.

The operation of the automatic device is as follows: As the vehicle moves the small pinion 83, driven by the odometer, turns the large transparent gear 85 which carries both the mileage scale 16a and the gallons of gasoline purchased scale 48a. The adjacent coordinating miles per gallon scale 46a on disk 100 is indirectly driven by the odometer through a complicated mechanism so that it is always in proper correspondence with the gasoline scale 46a. This mechanism includes the pinion 83, gear 85 fast on shaft 78 to which cam 86 is also secured, the latter driving toothed sector 80 which in turn drives gear 95 fast to disk 100 bearing the miles per gallon scale 46a.

Hence after any reasonable distance traveled, which should be at least 40 to 60 miles because of the techincal difficulty of making the cam accurate at low mileages, the gasoline tank is then filled and the number of gallons per mile can be read on scale 46a on the smaller disk 100 opposite the proper reading on transparent large gear 85 which denotes the number of gallons which has been purchased. The driver now releases the pinion 83 by pushing it gently down out of mesh, this causing the spring 88 to return the entire mechanism to the starting position. This reading of the miles per gallon and the lowering of the pinion 83 is all that the driver ever has to do, the other movements being automatic.

In the modification shown in Figure 9 the principle is almost exactly the same but in this case the base 10a and the top cover 22a are made of plastic. One noticeable difference is that when using plastic I can provide a circular recess 99 in the base 10a the more readily to receive inside of the device the folded over portion of the arm 30 of the cam 25. The handle 26 or small portion at the end of the lever extends between the inturned edges of the two parallel portions much as before. The base 10a has an upstanding cylindrical boss 101 which centers the mileage disk 15. The cam 25 and its arm 30 are exactly as in the metal form but I find it convenient to place a Belleville steel washer 102 between the cam and the cardboard mileage disk 15 to urge these two members apart. The washer which is simply an ordinary spring washer, centrally bent and then dished, rests on the top of boss 101 and is mounted on the mid-diameter 106 of the center post 14a. It is convenient to make the follower 42a of colored plastic preferably opaque. An integral lip 104 of the follower is bent parallel to the main body so as loosely to embrace the cam 25. An insert 107 having a rounded point is secured between the main body of the follower and the inturned lip 104 and serves exactly as the shaft 56 in the metal embodiment. While in the metal form I much prefer that the center bolt shall not be riveted, the same conditions do not obtain in the plastic model and I therefore rivet or spin over the top portion 108 and the bottom portion 109 and since the post has to be formed on a screw machine, it is quite convenient to provide a narrow neck 111 which passes thru the upper cover 22a and to have a fairly large diameter midportion 112 to guide the follower 42a and to reduce the neck 113 as it passes thru the base or bottom plate 10a. It will be noted that the widest portion 112 spaces the cover 22a from the follower and its bottom surface provides a fairly firm bearing for the cam as it is urged upwardly by the washer 102. Where the calculator can be preserved against scratching, the plastic material is preferred, differing but little from the metal form.

What I claim is:

1. In combination, a cover having a scale thereon, a circular disk rotatably carried by the cover and carrying a circular scale of miles, a lever, a clutch device carried by the lever, and engaging the disk to move same in one direction only, a cam portion rotatable with the lever, and a cam follower member engaging the cam portion and carrying a scale observable through the cover in registry with the scale on the cover, the disk and the cam portion rotating about a common pivot, one of said scales being a scale of gallons and the cooperating scale being a scale of miles per gallon.

2. The device of claim 1 in which the cam portion is substantially a logarithmic curve thru the greater portion of its camming face and has an additional curved portion to maintain the follower in a generally central position when the follower roller engages the additional curved portion.

3. The device of claim 1 in which the cam portion includes a substantially logarithmic curve calculated to have its maximum radius corresponding to the smallest unit and its minimum radius corresponding to the largest unit whereby the follower will move inwardly as the unit value increases.

4. In combination, a circular disk carrying a closed scale of miles, means to rotate the disk, a cam rotatable about the axis of the disk, a pivotal cam follower in contact with the cam, and a logarithmic scale operatively connected to the cam follower, a cooperating logarithmic scale fixed with respect to the pivot of the disk, the maximum radius of the cam corresponding to a unit value in excess of the minimum value and the minimum radius of the cam corresponding to a unit value lower than the maximum value, the values having the ratio of about 1:10.

5. The combination of claim 4 in which the cam corresponds to a minimum value of greater than 10 miles and a maximum value of less than 600 miles, and one of the scales is a scale of miles per gallon, corresponding to a range very roughly 4 to 40 and the associated scale is a similar but reversed scale of gallons.

6. In a calculating machine, a top plate, a bottom plate, a post extending from one plate to the other and having a centrally located flange, a lower member compressed between the flange and the bottom plate, a mid-member rotatable on the post and guided by the flange, a spacer on the post resting on the mid-member and having a reduced diameter stud loosely engaging the top plate, a top member on the stud and engaging the body of the spacer, and means for binding the post between the plates, whereby the top member and the mid-member provide bearings to limit wabbling with respect to the common axis without being gripped as the means is tightened.

7. The device of claim 6 in which the bottom member is a mileage disk frictionally rotatable about the post, the mid-member is a cam pivoted on the post and the top member is a cam follower having a slotted engagement with the post.

8. In a calculating machine, a rotatable mileage disk adapted to be driven from the odometer mechanism of an automobile, a pair of scale bearing members cooperating with each other to indicate miles per gallon, both of the scales being coaxial with the mileage disk, a driving connection from the mileage disk to the other of said scale bearing members and means to reset the mileage disk, whereby the mileage disk serves as a trip mileage indicator between successive fillings of the gasoline tank of the automobile.

9. In a calculating device for reading miles traveled by a vehicle per gallon of gasoline, a main shaft adapted to be driven by a pinion turning in relation to the travel of the vehicle, spring means for resisting such movement of the shaft, a cam on said shaft, a circular scale loosely mounted on the shaft, means for oscillating the scale including a cam follower engaging the cam, means for disconnecting the pinion, and a stop for limiting turning of the shaft by its spring when the pinion is disconnected.

10. The device of claim 9 in which a gear meshing with the pinion carries a circular miles traveled scale and a coaxial scale of gallons of gasoline purchased, the last named scale registering with the circular scale loose on the shaft.

11. In a device for determining miles per gallon of gasoline where the vehicle tank is filled each time fuel is purchased, a base having a central boss, a mileage disk on the boss, a flanged post mounted on the boss, a cam pivoted on the post and engaging the flange, spring means urging the cam and disk apart, a cam follower pivoted on the flange, a cover engaging the flange and having thereon a logarithmic scale of gallons of fuel purchased, said cam follower having thereon in registry with the gallons scale a similar but reversed scale.

12. The device of claim 11 in which the disk carries a uniform scale of miles, the cam moves the disk in one direction only, and the cam is curved to move the follower to indicate the distance traveled by the vehicle according to a logarithmic law.

13. The device of claim 11 in which the cam includes a logarithmic curve calculated to have its greatest radius equivalent to the number of miles so the cam follower moves inwardly as the miles increase.

14. The device of claim 11 in which the cam has means engaging the mileage disk to move the disk as the handle moves in one direction and to free the disk from the cam as the handle moves in reverse direction.

15. In a device of the class described, a shaft, a circular mileage disk on said shaft, a cam movable in one direction with the disk and moving free of the disk in opposite direction, a cam follower, means for moving the disk and cam in said one direction, and a helical spring holding the follower against the cam, said spring having one end fast to the shaft and the other end free to slip to prevent overwinding.

16. In a calculating machine, a disk rotatable about a central pivot and having a uniform scale of miles concentric with said pivot, a cam rotatable about said pivot, a cam follower constantly engaging the cam, a logarithmic scale movable with the follower, a relatively stationary cooperating logarithmic scale one of said logarithmic scales being a scale of miles per gallon and the cooperating logarithmic scale being a scale of gallons of fuel, and means to move the cam thru an angle corresponding to the miles travelled with said uniform scale of miles, whereby to indicate on the miles per gallon scale the miles per gallon obtained in registry with the number of gallons as read on the said cooperating scale.

17. The device of claim 16 in which the cam has a single turn edge camming portion following the negative logarithm of a unit so that as the units increase, points on the camming surface move constantly closer to the axis of movement of the cam.

18. The device of claim 16 in which the two logarithmic scales are similar but reversed, one reading from right to left and the other scale reading from left to right.

19. The device of claim 16 in which the means causes the mileage disk to move with the cam as the cam is revealed in one direction but frees the mileage disk when the cam is moved in opposite direction, whereby the mileage disk moves in one direction only, and stop means for limiting movement of the cam in said opposite direction.

20. In a calculator for determining the number of miles obtained per gallon of fuel; a pivoted mileage disk, a coaxially pivoted cam, means for clutching the cam to the disk, said cam having a logarithmic camming portion with a radial displacement decreasing as the disk is turned to indicate increase in miles traveled, and a pivoted cam follower having thereon one of a pair of cooperating logarithmic scales, a relatively stationary member having thereon in registry with said one scale the cooperating logarithmic scale, one of said scales increasing from right to left and the other scale increasing from left to right, one of the scales indicating the number of gallons required to fill the tank and the other representing miles per gallon.

21. In a calculator for determining the number of miles obtained per gallon of fuel; a pivoted mileage disk, a coaxially pivoted cam, means for clutching the cam to the disk, and means for holding the mileage disk against rotation as the cam is moved in a direction opposite to that to clutch the disk.

22. A calculator for determining the number of miles obtained per gallon of fuel comprising a relatively stationary member, a logarithmic scale fixed with respect to said member, a first movable member adapted to be moved in accordance with the miles traveled as indicated on a uniform scale movable with the first movable member, said first movable member being pivoted with respect to the stationary member at the center of said uniform scale, a second movable member carrying an inverse logarithmic scale readable in cooperation with said first mentioned logarithmic scale, and means movable with the first movable member and coaxial therewith for moving said second movable member angularly, proportional to the logarithm of the angular movement of the means about its pivot, which in turn is proportional to the number of miles traveled as indicated by the uniform scale as the first movable member is moved, one of the two cooperating logarithmic scales indicating gallons of fuel and the other logarithmic scale representing miles per gallon.

23. A device for determining miles per gallon of fuel where a vehicle tank is filled each time fuel is purchased, comprising: a base, a mileage disk pivoted with respect to the base, a cam pivoted coaxially with the mileage disk, a cam follower, a logarithmic scale fixed with respect to the base, and a similar but reversed logarithmic scale movable with the cam follower, one of said logarithmic scales representing gallons of fuel required to fill the tank and the cooperating logarithmic scale representing miles per gallon.

References Cited in the file of this patent

UNITED STATES PATENTS

| | | |
|---|---|---|
| 943,779 | Goss | Dec. 21, 1909 |
| 1,433,536 | Dugit-Gros | Oct. 31, 1922 |
| 1,435,422 | Schiske | Nov. 14, 1922 |
| 1,459,886 | Hammond | June 26, 1923 |
| 1,467,847 | Fulton | Sept. 11, 1923 |
| 2,344,146 | Huntley et al. | Mar. 14, 1944 |
| 2,357,131 | Putnam | Aug. 29, 1944 |
| 2,489,030 | Herrick | Nov. 22, 1949 |
| 2,651,456 | Highstone | Sept. 8, 1953 |
| 2,661,900 | Pastorius | Dec. 8, 1953 |

FOREIGN PATENTS

| | | |
|---|---|---|
| 231,619 | Great Britain | Apr. 9, 1925 |
| 299,745 | Great Britain | Oct. 29, 1928 |
| 39,434 | Holland | June 15, 1936 |